United States Patent [19]

Bailey

[11] 3,746,849

[45] July 17, 1973

[54] CORDIC DIGITAL CALCULATING APPARATUS

[75] Inventor: Christopher Edmund Gervase Bailey, Cranleigh, England

[73] Assignee: The Solartron Electronic Groups Limited, Hampshire, England

[22] Filed: Aug. 12, 1971

[21] Appl. No.: 171,223

[30] Foreign Application Priority Data

Aug. 13, 1970 Great Britain .................. 39,123/70

[52] U.S. Cl. .................. 235/156, 235/158, 235/159
[51] Int. Cl. .................. G06f 7/48, G06f 7/52
[58] Field of Search .................. 235/156, 158, 159, 235/164, 165, 167

[56] References Cited

UNITED STATES PATENTS 3,649,821 3/1972 Gumacos .................. 235/152

OTHER PUBLICATIONS

M. Lehman, "Serial Arithmetic Techniques," 1965 Fall Joint Computer Conf. NFIPS Proc. Vol. 27, 1965, pp. 715–725.

E. V. Krishnamurthy, "On Optimal Iterative Schemes for High-Speed Division," IEEE Trans. on Computers, Vol. C–19, No. 3, pp. 227–231 March 1970.

M. J. Flynn, "On Division by Functional Iteration," IEEE Trans. on Computers, Vol. C–19, No. 8, August 1970, pp. 702–706.

*Primary Examiner*—Charles E. Atkinson
*Assistant Examiner*—David H. Malzahn
*Attorney*—William R. Sherman, Jerry M. Presson et al.

[57] ABSTRACT

Digital calculating apparatus, comprising two shift register stores with each store connected in a recirculating circuit loop which includes means for changing a number in one store by an arithmetic progression, typically linear or exponential. Initial values are entered in both stores and successive recirculations of digital data are effected in each loop in a manner which causes one loop to undergo a plurality of N addition or subtracting cycles, and also causes the other loop to undergo a plurality of M recirculating cycles where M is equal to or less than N. Through recirculation in the manner described, one of the stores converges upon a predetermined final value and the desired answer in digital form may then be obtained from the other store.

12 Claims, 9 Drawing Figures

Figure 1:
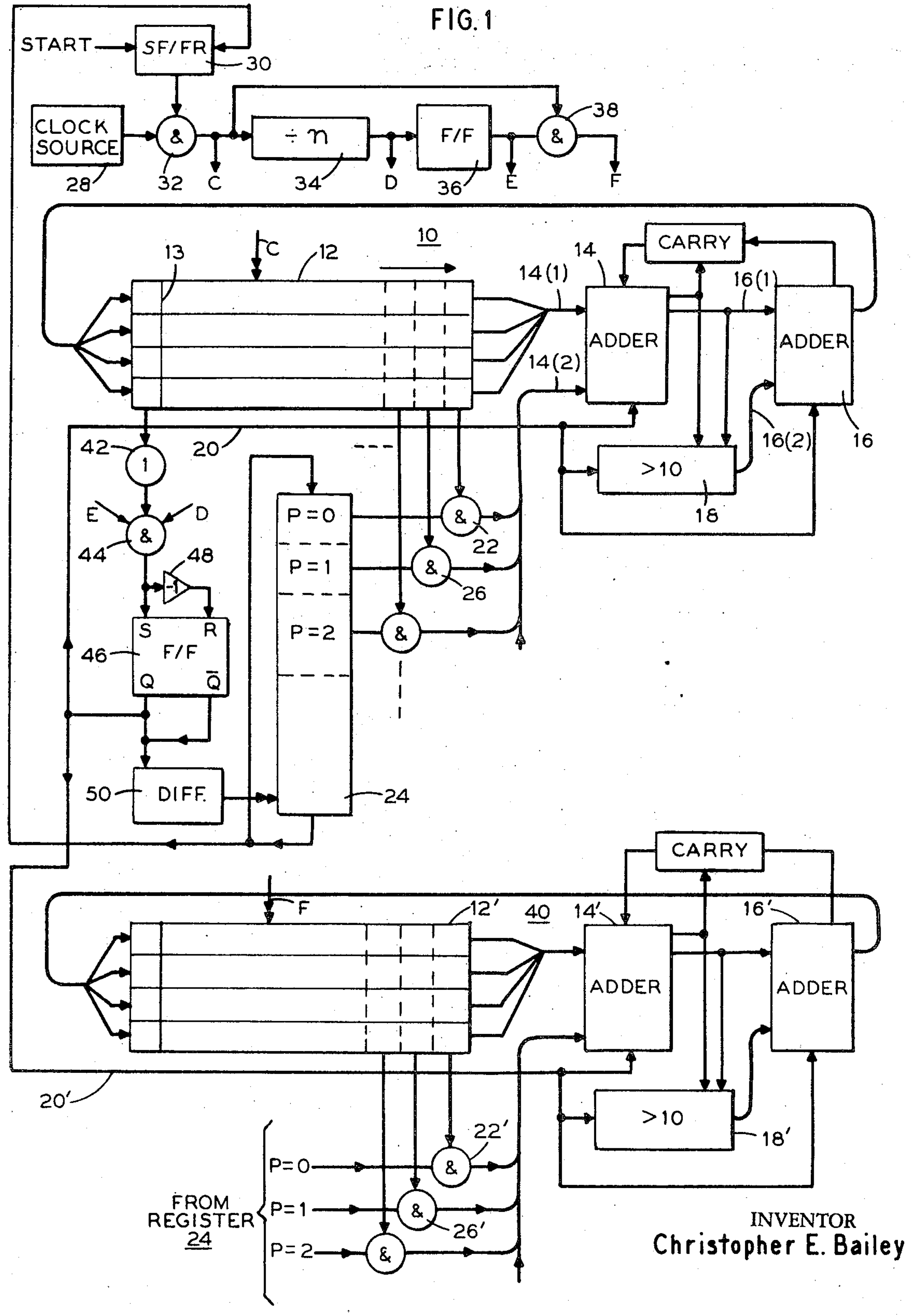

United States Patent [19]
Bailey
[11] 3,746,849
[45] July 17, 1973
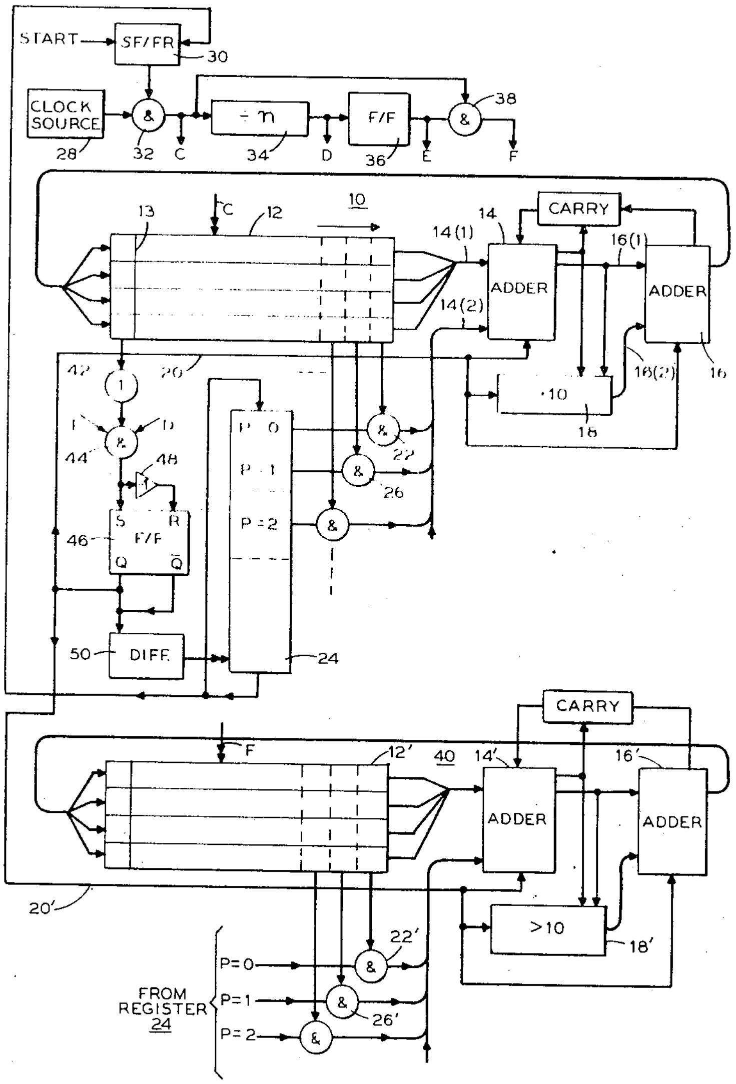

INVENTOR
Christopher E. Bailey

Patented July 17, 1973 3,746,849

6 Sheets-Sheet 4

Patented July 17, 1973 3,746,849

6 Sheets-Sheet 6

CORDIC DIGITAL CALCULATING APPARATUS

This invention relates to digital calculating apparatus adapted to calculate a wide variety of functions of one or more independent variables. The object of the invention is to provide apparatus which is based upon the use of shift registers, since such registers are becoming increasingly cheaper with the advance of MOS and other integrated circuits, and therefore form a desirable basis for inexpensive digital calculating circuits.

Basically a shift register refers to a single chain of binary stages whose bits can be shifted in a predetermined direction along the register by the application of shift pulses. However, the term "shift register store" is used herein with a more general meaning to include not merely an elementary binary shift register but also a plurality of elementary shift registers operating in parallel. One stage of such a store comprises the corresponding binary stages of all the elementary registers and holes one digit of a non-binary number coded by the bits in the said binary example. The pre-eminent example of such an organization is of course BCD (binary=coded decimal), of which a detailed example is given below.

The number in a shift register store may be caused to progress from an initial value to a final value by either of what will be referred to herein as linear progression and exponential progression. Linear progression consists of repeatedly adding to or subtracting from the contents of the store a succession of decreasing terms, which may simply be stored terms made available from a ROM (read only memory) for example, or may be a logical sequence of numbers, such as decreasing powers of the radix of the number system employed. Taking the decimal system for example, the terms may commence with 1 and therefore progress $$10^0 = 1,\ 10^{-1} = 0.1,\ 10^{-2} = 0.01, \text{ etc.}$$

Given these terms, we can progress from 3.00 to 6.42 as follows:

a. Add unit increments until the required value is equalled or passed.

$$3.00 + 1 + 1 + 1 + 1 = 7.00 \text{ (four additions of 1)}$$

b. Subtract 0.1 unit increments until the required value is equalled or passed.

$$7.00 - 0.1 - 0.1 - 0.1 - 0.1 - 0.1 - 0.1 = 6.40$$

(six subtractions of 0.1)

c. Add 0.01 unit increments until the required value is equalled or passed.

$$6.40 + 0.01 + 0.01 = 6.42 \text{ (two additions of 0.01)}.$$

Alternative progression is:

$$3.00 + 1 + 1 + 1 = 6.00$$

$$6.00 + 0.1 + 0.1 + 0.1 + 0.1 = 6.40$$

$$6.40 + 0.01 + 0.01 = 6.42.$$

d. In this alternative progression it would be necessary to provide means for indicating that the next addition or subtraction would cause the sum to pass the required value.

Exponential progression consists of repeatedly adding to or subtracting from the contents of the store its own contents divided by a succession of increasing powers of the radix of the number system employed.

Consider again the decimal system and the example of going from 3.00 to 6.42:

a. Add the number to itself until the required value is equalled or passed $$3.00 + 3.00 = 6.00$$

$$6.00 + 6.00 = 12.00$$

b. Subtract one tenth of the number from itself until the required value is equalled or passed $$12.00 - 1.20 = 10.80$$

$$10.80 - 1.08 = 9.72$$

$$9.72 - 0.97 = 8.75$$

$$8.75 - 0.88 = 7.87$$

$$7.87 - 0.79 = 7.08$$

$$7.08 - 0.71 = 6.37$$

c. Add one hundredth of the number from itself until the required value is equalled or passed $$6.37 + 0.06 = 6.43$$

d. Continue to the level of resolution required.

Each step in the above progression is in effect a multiplication, i.e., a multiplication by (1 + 1 ), by (1 − 0.1) and by (1 + 0.01) in (a), (b) and (c) respectively.

Thus the overall progression may be expressed as:

$$3.00 \times 2^2 \times (0.9)^6 \times (1.01)^1 = 6.43.$$

The symbol E will be used to represent the effective total of all exponential progression steps, i.e., 3.00 × E = 6.43.

With this background the present invention can now be defined. According to the invention there is provided digital calculating apparatus comprising two shift register stores. Means are provided for entering initial values in the stores and each store is connected in a recirculating loop which includes a combining circuit arranged to cause the number in the store to change by linear or exponential progression, as hereinbefore defined, as successive recirculations are effected under the action of a control means. The control means is adapted to cause one loop to undergo groups of N adding or subtracting cycles, where N is a whole integer, and further is adapted to cause the other loop to undergo groups of M adding or subtracting cycles, where M is an integer equal to or less than N, whereby the number in one of the stores converges to a predetermined final value. The required answer may then be found in the other store.

It will be convenient to call the store for which the final value is predetermined the master store and the other store the slave store. The final value will also be referred to as the target.

The following examples will show the flexibility of the invention in generating a wide range of functions. The list is by no means exhaustive.

Division  Given $x$ and $y$ find $y/x = A$

Master store: initial value $x$
 progression — exponential, N = 1
 target — 1.0

Slave store: initial value $y$
 progression — exponential, M = 1
 end result — A Thus $x{\cdot}E = 1.0$ and $y{\cdot}E = A$ Therefore $E = 1/x = A/y$ and $A = y/x$.

Multiplication  Given $x$ and $y$ find $x{\cdot}y$.

Master store: initial value 1.0
progression — exponential, N = 1
target $x$
Slave store: initial value $y$
progression — exponential, M = 1
end result — $A$
Thus $(1.0)\cdot E = x$ and $y\cdot E = A$
Therefore $E = x = A/y$ and $A = x\cdot y$ Combined Multiplication and Division Given $x\cdot y$ and $z$ find $xy/z$.
Master store: initial value $z$
progression — exponential, N = 1
target $x$
Slave store: initial value $y$
progression — exponential, M = 1
end result — $A$
Thus $z\cdot E = x$ and $y\cdot E = A$
Therefore $E = x/z = A/y$ and $A = xy/z$.

Square Root of $x$
Master store: initial value 1.0
progression — exponential, N = 2
target $x$
Slave store: initial value 1.0
progression — exponential, M = 1
end result $A$ The effect of using N = 2, whereas M is only 1 is, to multiply by $E^2$ instead of $E$.
Thus $(1.0)\cdot E^2 = x$ and $(1.0)\cdot E = A$
Therefore $E = A = \sqrt{x}$.

This alogrithm will equally work if both initial values are $x$ and the master store target is 1.0.
Thus $x\cdot E^2 = 1$ and $x\cdot E = A$
Therefore $E = 1/\sqrt{x} = A/x$ and $A = \sqrt{x}$.

This variant is described in detail in the embodiments given below.

The above alogrithm, starting with initial values of 1.0, will obviously extend to extraction of the cube root and higher roots if M is kept equal to 1 while N is made 3 and so on.

Log $x$, i.e., Log $_{10}x$.
Master store: initial value 1.0
progression — exponential, N = 1
target $x$
Slave store: initial value zero
progression — linear, M = 1
end result — A In the linear progression the successively used terms are $\log_{10}2$, $\log_{10}0.9$, $\log_{10} 1.01$, etc.

$A$ is therefore equal to $$a \log_{10}2 + b \log_{10} 0.9 + c \log_{10}1.01 + \ldots$$

where $a$, $b$ and $c$ are the numbers of additions and subtractions of the successive terms, i.e., in the exponential progression $$E = 2^a \times (0.9)^b \times (1.01)^c \times \ldots$$

By inspection the expression for $A$ is log $E$.
Therefore we have $(1.01)\cdot E = x$ and $\log_{10}E = A$ whence $A = \log_{10}x$.

The apparatus according to the invention can also be arranged to generate circular functions by means of the known Cordic algorithm. Hence one and the same piece of hardware, suitably programmed, can provide all the circular and hyperbolic functions, as well as extract roots and perform multiplication and division, as well as addition and subtraction.

If a recirculating loop reforms an exponential progression, the contents of the store have added thereto or subtracted thereform the said contents divided by $R^P$ where R is the radix of the number system and P is initially 0 and is incremented by 1 following each group of N cycles which causes, or would cause if allowed to occur with P unaltered, the number in the store of the said one loop to pass through the predetermined final value.

Two detailed embodiments of the invention are described below in the configuration for extracting square roots. One is purely binary and the said radix is 2; the other is BCD and the said radix is 10. In the binary embodiment each register is duplicated, in parallel, the pair of registers being connected to the two inputs of the combining circuits, and a shift by P orders which is equivalent to dividing by $2^P$ is effected by shifting the contents of one register P bits in the direction of decreasing significance before each adding or subtracting cycle. In the BCD embodiment each register comprises, in known manner, four parallel shift registers holding the bits of significance 1,2,4 and 8 in every decade. The division by $10^P$ is effected by gating to the second input of a known parallel BCD adder the $(P + 1^{th})$ stages of the four registers, counting from the least significant end. The alternatives described in relation to the binary embodiment could be taken over to the BCD embodiment, and vice versa. Operation is also possible in other binary-based codes, though pure binary and BCD are the practical alternatives.

The two embodiments both extract the square root and N =2 while M =1. Both embodiments start with $x$ in both stores and the master store target is 1.0. In this case, if N = 3 and M = 1 the cube root is extracted and the invention can be extended to other roots.

Another feature common to both embodiments is that overflow is allowed to occur and when it does subtraction is effected in the following groups until a condition of no overflow is restored, when addition takes place until overflow again occurs. However, by analogy with known techniques in division it is obvious that two other alternatives are possible. In one, if overflow occurs, one subtracting group follows with P unchanged and then P is incremented and additions take place. In the second as each group of addition cycles takes place a trail group, one group ahead, is also effected to the extent necessary to tell whether or not overflow would be caused if it would P is incremented by 1 before the next group is actually effected.

A numerical example illustrating the technique of alternating additions and subtractions, will now be given for the case of extracting the square root of 0.49.

| Group of Cycles | Value of P | First Loop $N = 2$ | Second Loop $M = 1$ |
|---|---|---|---|
| 1st | 0 | 0.49 | 0.49 |
| | | +(0.49/0.98) | |
| | | +(0.98/1.96)— OVERFLOW | +(0.49/0.98) |
| 2nd | 1 | −(0.20/1.76)— (Rounded up) | |
| | | −(0.18/1.58) | −(0.10/0.88) |
| 3rd | 1 | −(0.16/1.42) | |
| | | −(0.14/1.28) | −(0.09/0.79) |
| 4th | 1 | −(0.13/1.15) | |
| | | −(0.12/1.03) | −(0.08/0.71) |
| 5th | 1 | −(0.10/0.93)— OVERFLOW REMOVED | |
| | | −(0.09/0.84) | −(0.07/0.64) |
| 6th | 2 | +(0.01/0.85) | |

| | |
|---|---|
| +(0.01/0.86) | +(0.01/0.65) |
| (14 more groups) | |
| 1.00 | 0.72 |

The answer given is 0.72 compared with the true answer of 0.70. The error is within the limits of accuracy imposed by working to 2 decimals only. In practice a larger number of decimals would be used.

It will be noted that, although in groups 5 the overflow is removed in the first subtraction cycle in the first loop, the group is completed before P is increased to 2 and the switch is made to addition.

Figure 2:
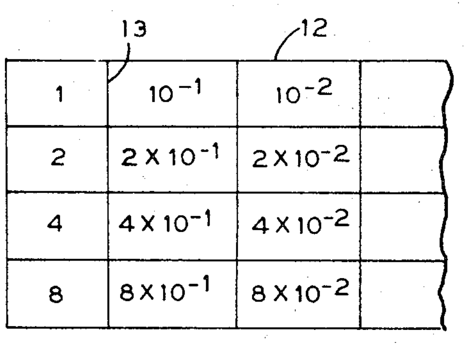
Figure 3:
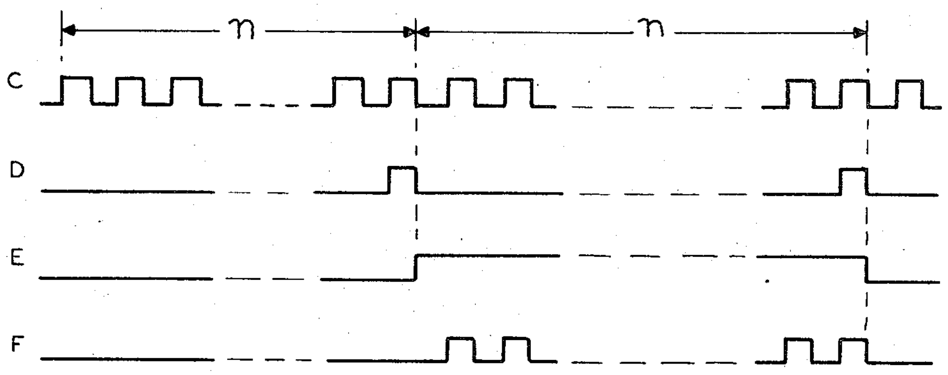
Figure 5:
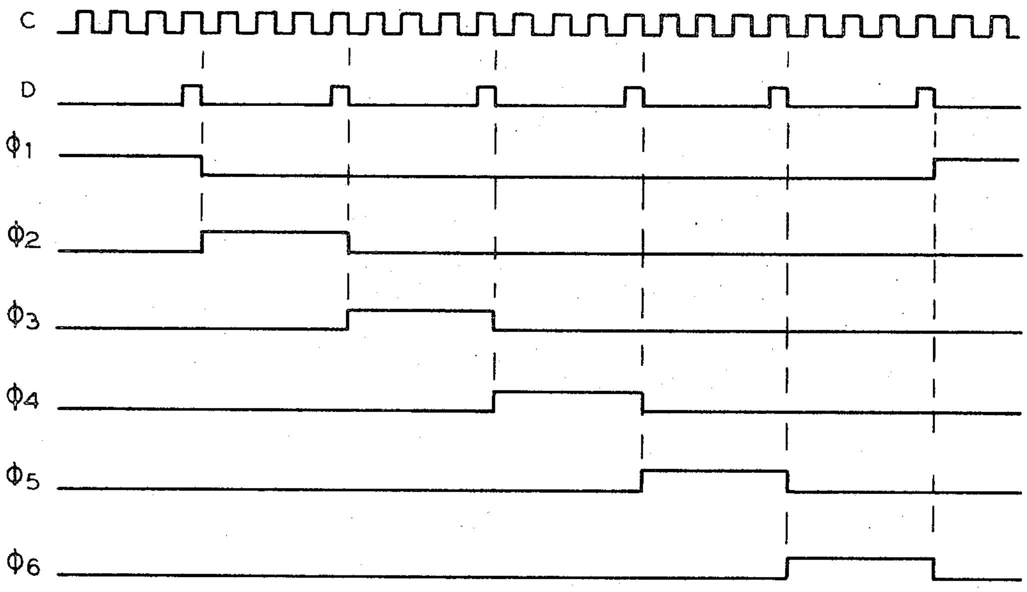
Figure 4:
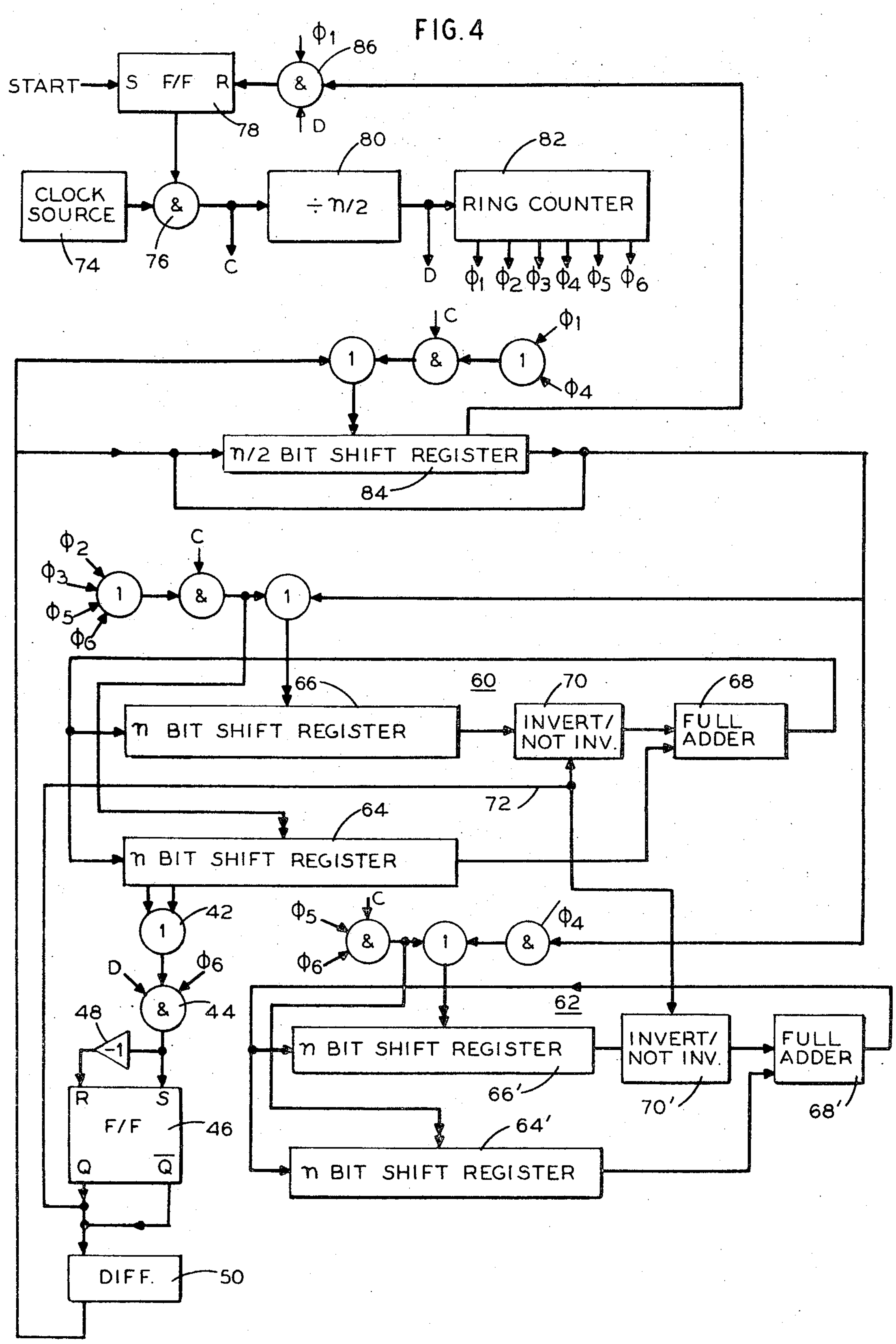
Figure 6:
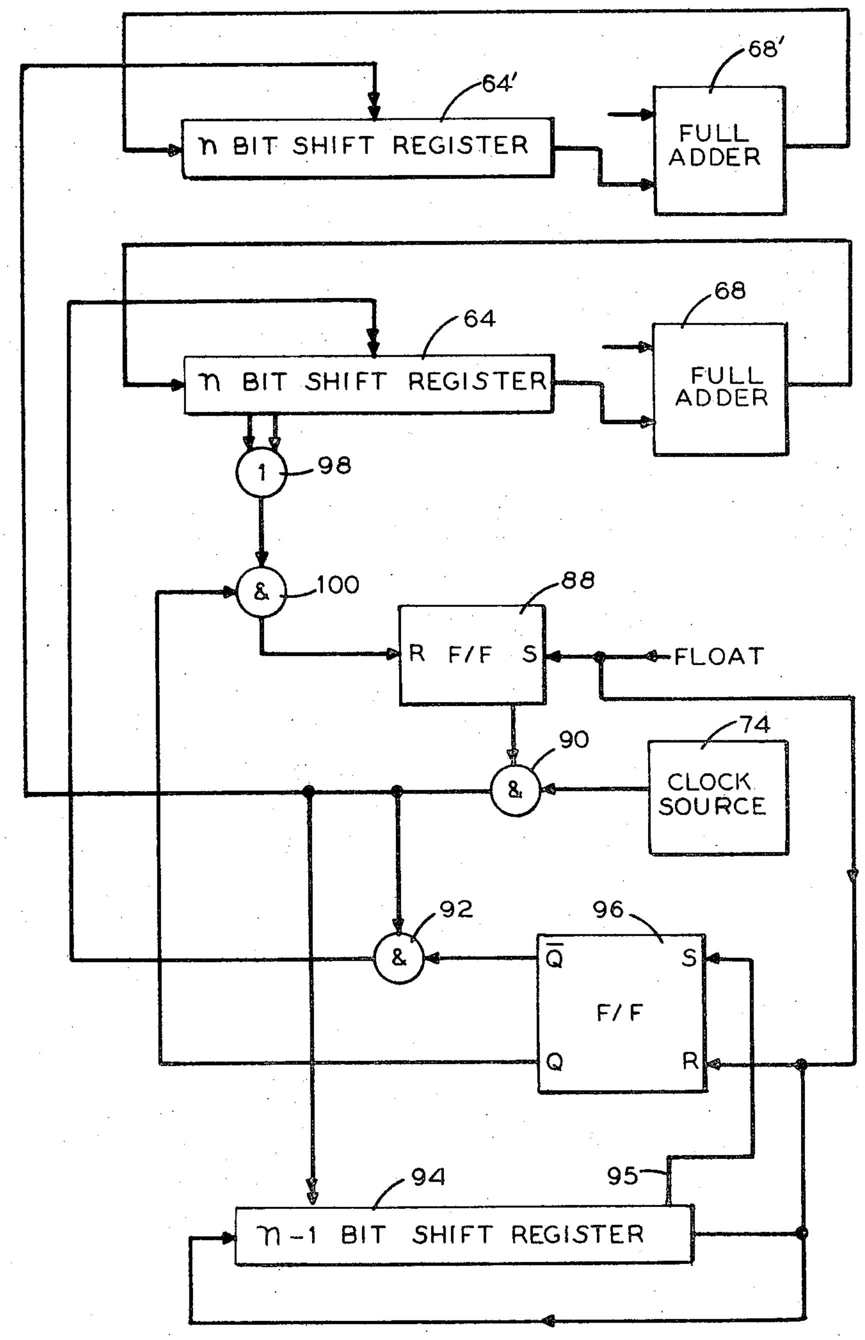

The invention will now be described in further detail,by way of example, with reference to the accompanying drawings, in which:

FIG. 1 is a block schematic diagram of a BCD embodiment of the invention for extracting square roots, FIG. 2 illustrates the organization of a register in FIG. 1, FIG. 3 shows timing diagrams for FIG. 1, FIG. 4 is a block schematic diagram of a binary embodiment of the invention for extracting square roots, FIG. 5 shows timing diagrams for FIG. 4, FIG. 6 is a diagram of circuitry additional to that of FIG. 4 for floating the binary point.

Figure 7:
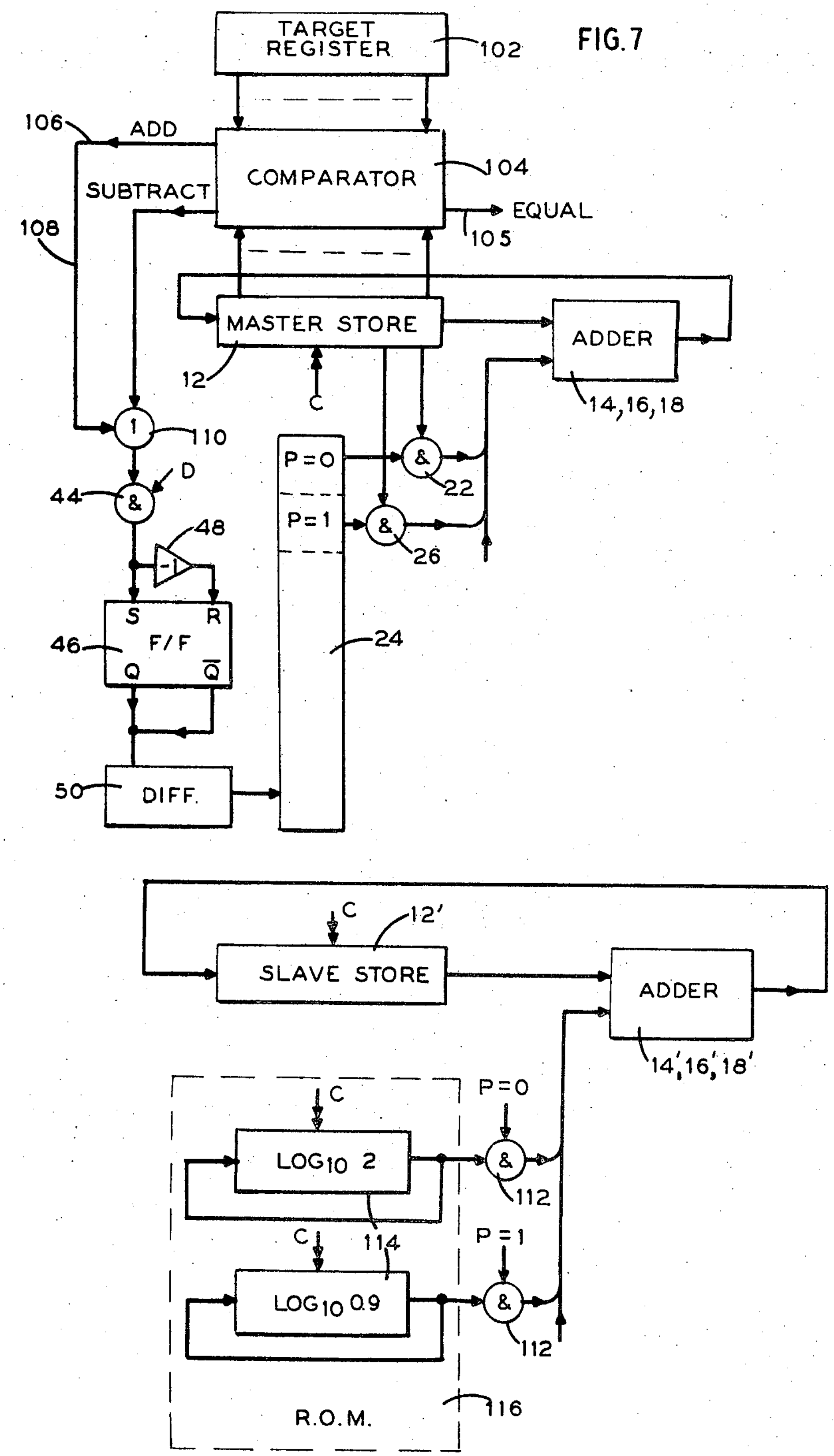
Figure 8:
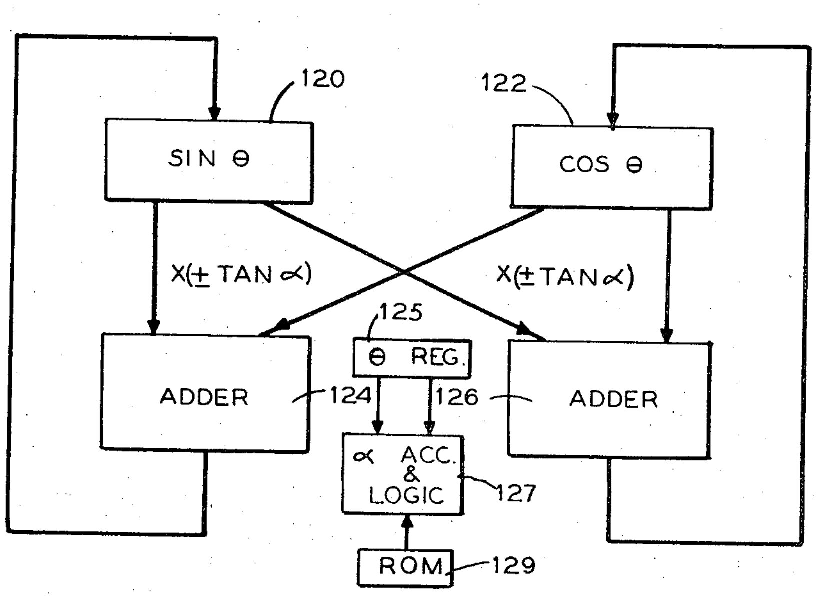
Figure 9:
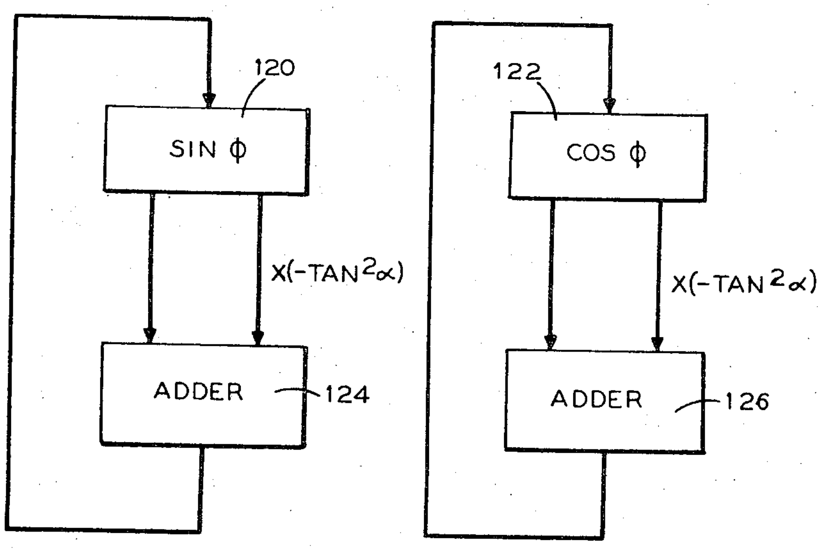

FIG. 7 is a block schematic diagram of an embodiment of the invention for calculating $\log_{10}x$, and FIGS. 8 and 9 are schematic diagrams of apparatus for performing the CORDIC algorithm in two modes of operation.

In FIGS. 1, 4 and 6 double headed arrows are used to indicate shift inputs to registers.

In FIG. 1 a first recirculating loop 10 comprises a shift register store 12 made up of four shift registers operating in parallel to store a BCD number in a manner well known per se. The organization of the store will be apparent from the diagram in FIG. 2 illustrating the most significant, left hand end thereof, with the decimal point indicated by line 13. The 16 10 is completed by first and second full adders 14 and 16 operating on the four bits of each decimal digit in parallel, the adders having first inputs 14 (1) and 16 (1) respectively in the loop and second inputs 14 (2) and 16 (2). The input 14 (1) is connected to the least significant end of the register 12. The derivation of the numbers presented at the second input 14 (2) will be described below. The first adder 14 adds the two BCD digits at its inputs 14(1) and 14(2) and presents the sum digit to the input (16) (1) of the second adder. If the sum is less than 10 the adder 16 simply passes the sum digit back to the most significant end of the register 12. If the sum is 10 or more, i.e., if the adder 14 generates a carry (sum greater than 15) or if the sum digit consists of 8 AND (2 or 4), a circuit 18 applies the BCD digit 6 to the second input 16(2) of the second adder 16. If this adder then generates a carry digit it is stored for use by the adder 14 in the next cycle.

The result of these operations will be apparent from two examples: 6 + 7 = 13 appears as 8, 4, 1 at the output of the first adder 14. The circuit 18 requires the second adder to add 6, i.e. 13 + 6 = 19 appears as 3 ( = 2, 1) at the output of the second adder, and carry stored for next decimal digit.

9 + 9 = 18 appears as 2 at the output of the first adder 14 and carry stored for the next decimal digit. The circuit 18 detects the carry and causes the second adder to add 6, i.e., 2 + 6 = 8.

This brief description of the function of the adders 14 and 16 will suffice since the technique for adding BCD digits in known per se. Also known are the corresponding rules for effecting subtraction and, for the purpose of the present disclosure it will suffice to say that, when a signal is present on a line 20 the circuit 14, 16 and 18 subtract the digit on input 14 (2) from the digit on input 14 (1). When the signal is absent the two digits are added.

Initially the digits presented to the input 14(2) are derived from the least significant decade of the register 12 via a gate 22, which is enabled by a bit in the first stage of a recirculating shift register 24, this stage being labelled P = 0 in correspondence with the convention established above. Each recirculation of the loop 10 therefore adds the number in the register 12 to itself.

When the bit in the register 24 is shifted to the next stage, P = 1, a gate 26 is enabled to couple the second least significant decade of the register 12 to the input 14(2), which then *subtracts* (for reason explained below) one tenth of the number in the register 12 from the number itself in each recirculation. When P = 2 one hundredth of the number in the register 12 is *added* to the number itself in each recirculation and so on. It will be understood that each gate 22, 26 etc. is a multiple gate handling 4 bits in parallel.

The recirculations of the loop are controlled by a source of clock pulses 28. When a bistable flip-flop 30 is set by a start pulse, it enables a gate 32 to pass the clock pulses C (FIG. 3) to the register 12. The pulses C are divided by *n* by a circuit 34 to produce end of train pulses D. *n* is the number of decades in the register 12, being two digits greater than the required number of decimals below the point. The spare digits are the overflow units digit and the least significant digit which is retained to minimize rounding errors. The pulses D are further divided by two by a flip-flop 36 to provide a signal E marking off odd and even trains of N pulses. The signal E enables a gate 38 to pass even-numbered trains only of the clock pulses, viz pulses F in FIG. 3. These are used to control a second recirculating loop 40 which is described below. When the bit in the shift register 24 re-enters P = 0 it resets the flip-flop 30 to terminate the operation. The register 24 is made of such length as is required by the value of P to which the calculation is to be carried.

The circuit which shifts the P bit in the register 24 and determines whether the adders 14 and 16 add or subtract will now described. The units (most significant) decade of the register 12 is tested for an overflow digit by an OR gate 42; this detects any bit = 1 in this decade. The output of the gate 42 is applied to an AND gate 44 which is enabled by the end of train pulse D only in the presence of signal E, i.e., only at the end of even recirculations. If an overflow digit is present, a flip-flop 46 is set (set terminal S). The output of the gate 44 is inverted by an inverter 48 whose output is applied to the reset terminal R so that the flip-flop 46 is reset when an overflow digit disappears. The Q output of the flip-flop 46 is connected to the line 20 to cause the adders 14 and 16 to subtract when the flip-flop is set. Furthermore the Q and $\overline{Q}$ outputs of the flip-flop are both connected to a differentiator 50 which provides a pulse whenever the flip-flop changes state. This pulse constitutes the shift pulse for the register 24.

It is arranged that the number whose roots is to be extracted is floated to lie in the range 0.010 . . . to 0.999

. . . . This is a well known expedient in digital calculators and is not described here although it may be mentioned that the floating operation can be carried out in the register 12 itself. Compare the description of the second embodiment below. It is also assumed that it is arranged, using any convenient technique, to start with the flip-flop 46 reset.

It is then apparent that the operations of loop 10 will be exactly in accordance with the scheme for the "First Loop" typified by the numerical example of extracting a square root given above. Initially a group of two additions will occur with P = 0. If this group causes overflow, the flip-flop 46 will be set whereby P is shifted to 1 and the subtraction line 20 is energized. If the first group did not cause overflow, a second group of additions occurs (and if need be a third group and so on) with P = 0, until overflow does occur. When overflow has occurred one or more groups of two subtractions with P = 1 take place until the overflow is removed. Then one or more groups of two additions occur with P = 2, and so on.

The "Second Loop" of the numerical example is the loop 40 whose components are referenced as for the loop 10 with the addition of primes. The only difference is that the register 12' of the loop 40 is shifted by the pulses F instead of the pulses C and therefore only one addition or subtraction takes place in this loop for each group of two effected in the loop 10. The number in the register 12' at the end of the operation is thus the square root of the number originally entered in both the registers 12 and 12'.

In the binary embodiment of FIG. 4 the first and second loops are denoted 60 and 62 respectively, corresponding to the loops 10 and 40 respectively of FIG. 1. Constructionally the loops are again the same and therefore one only will be described.

The loop 60 comprises two parallel shift registers 64 and 66, each of length $n$ bits where $n/2$ is the number of bits to which working is required. The two most significant stages are of significance 2 and 1 respectively. All other stages are below the binary point. The two registers feed the two inputs respectively of a conventional serial full adder 68 whose output is fed back to the registers. However an inverting/non-inverting circuit 70 is included between the register 66 and the adder 68 and is controlled by a line 72 corresponding to the line 20 in FIG. 1. Where there is no signal on the line 72 the circuit 70 does not invert and the adder 68 simply adds the contents of the two registers. When there is a signal on the line 72 the circuit 70 inverts, effectively to form the complement of the number in the register 66, which is thus subtracted from the number in the register 64, in a manner well known per se. The circuit which provides the signal on the line 72 is essentially the same as in FIG. 1 and the same reference numerals 42, 44 46, 48 and 50 are used in FIG. 4.

The contents of the register 66 are divided by $2^P$ before each group of two additions or subtractions occurs by applying P shift pulses to the register 66, where P is initially 0 and increases by 1, each time the differentiator 50 provides a pulse, up to $n/2$. The circuit is controlled by a timing circuit which produces the waveforms shown in FIG. 5 and comprises a clock source 74 whose output is passed by a gate 76 as clock pulses C when a flip-flop 78 is set by a start pulse. The pulses C are divided by $n/2$ by a circuit 80 to provide end of pulse train pulses D which in turn drive a 6-stage ring counter 82 which produces rectangular waves $\phi_1$ to $\phi_6$ marking cyclically recurring trains of $n/2$ clock pulses. $\phi_1$ is used, as described below, to effect the P shifts in the register 66. $\phi_2$ and $\phi_3$ are used to effect one complete recirculation of the loop 60. $\phi_4$ is used to effect P shifts of both the register 66 and the corresponding register 66' in the loop 62. $\phi_5$ and $\phi_6$ are used to effect one complete recirculation of both the loop 60 and the loop 62. The operation of the AND and OR gates through which the shift pulses are applied to the registers will be evident from inspection of FIG. 4 and verbal description is not given. It will be noted that gate 44 is enabled by D (end of pulse train) and $\phi_6$. For simplicity FIG. 5 is drawn with $n/2 = 4$. In practice it would not be likely that 4-bit accuracy would suffice and $n/2$ might be 10 for example.

The clock pulses are also applied during $\phi_1$ and $\phi_4$ to another recirculating shift register 84 which is initially empty. The output of this shift register is applied as shift pulses to the registers 66' (in $\phi_1$ and $\phi_4$) and 66' (in $\phi_4$). When the register is empty, no shift pulses are applied in $\phi_1$ or $\phi_4$. However, each time the flip-flop 46 changes state, the differentiator 50 enters a 1 in the input end of the register 84 and the 1's which accumulate therein are effective as shift pulses, numbering P, on the registers 66 and 66'. It will therefore be apparent that the contents of the registers 66 and 66' will be divided by $2^P$ each time before they are added to or subtracted from the contents of the registers 64 and 64' respectively. Therefore the circuit of FIG. 4 performs the required mathematical operations as exemplified above. A gate 86 detects when, in $\phi_1$, there a bit in the output stage of the register 84 at pulse time D and resets the flip-flop 78 to terminate the operation.

A preferred technique for floating the binary point correctly will now be described. The additional control circuitry is illustrated in FIG. 6. The binary fraction to be square rooted is initially entered in the registers 64 and 64' only and shift pulses are applied to only these registers in the floating operation. The registers 66 and 66' therefore remain empty. The floating operation is initiated by setting a flip-flop 88 which opens a gate 90 to pass pulses from the clock source 74 to the register 64' and via a further gate 92 to the register 64. The pulses are also applied to a recirculating shift register 94 whose length is $n - 1$ stages and in which a single bit recirculates, the bit initially being in the last stage. The gate 92 is initially opened by a flip-flop 96 which is set after $n - 2$ clock pulses by an output 95 connected to the penultimate stage of the register 94 to close the gate 92 and is reset by the output of the last stage to re-open the gate. The effect of this arrangement is to mark off groups of $n - 1$ shift pulses applied to the register 64' and corresponding groups of $n - 2$ shift pulses applied to the register 64. Each group of $n - 1$ shift pulses shifts the contents of the register 64' one step in the direction of increasing significance while each group of $n - 1$ shift pulses shifts the contents of the register 64 two steps in the direction of increasing significance.

The object is to get the first significant bit in the register 64 in the first or second stage of that register below the binary point. The presence of such a bit is detected by an OR gate 98 whose output is applied to an AND gate 100 which is enabled only when the flip-flop 96 is set so that the test is applied at the correct time. The output of the AND gate 100 resets the flip-flop 88 to terminate the floating operation. The start pulse can now be applied to the flip-flop 78 in FIG. 4. The first cycle $\phi_1$ to $\phi_6$ will write the contents of registers 64 and 64' into the registers 66 and 66' respectively and then the first adding cycle will take place.

An example of the floating operation described will show that it puts the binary point in the correct place in the final result. The example taken is (0.000001)½ for which the answer is known to be 0.001 = ⅛.

| First Loop | Second Loop |
|---|---|
| 0.000001 | 0.000001 |
| n − 2 shift pulses 0.000100 | 0.000010 n − 1 shift pulses |
| n − 2 shift pulses 0.010000 | 0.000100 n − 1 shift pulses |

Floating operation complete

| | | |
|---|---|---|
| Add, P = 0 | 0.100000 | |
| | 1.000000 | 0.001000 |

Stop since number in first loop is exactly 1. Answer in second loop is 0.001000, which is correct. (In practice the embodiment of FIG. 4 would not stop here but would carry on with P = 1 , P = 2 etc. and the number in the second loop would fluctuate about 0.001000.)

In the embodiments as so far described, the target for the master store is 1.0 and it is easy to determine when to increment P by observing the overflow and "underflow" occurrences. If however the target is $x$, as in the alternative rooting alogithm, the multiplication algorithm and the log $x$ algorithm, it is merely necessary to provide a register for storing the target value and a comparator to determine, after each addition or subtraction, whether the number in the master store is equal to, less than or greater than the number in the target register.

By way of further example FIG. 7 is a simplified showing of the apparatus in the configuration in which $\log_{10} x$ is generated. For simplicity, the details of generating the shift pulses and of the logic which controls addition and subtraction are not repeated, in view of the full showing in FIGS. 1 and 4 the stores and adders are shown as single blocks, without attention to the details necessary in view of the fact that BCD operation is employed, these details being as in FIG. 1.

The master store 12 and its adder 14,16, 18 have the gates 22, 26, etc. provided as in FIG. 1 and controlled by the P register 24. A target register 102 and comparator 104 compare the contents of the master store 12 and the target register at the end of each recirculation and the comparator has three outputs as follows:

Output 105 = master contents = target value = stop.
Output 106 = master contents < target value = ADD
Output 108 = master contents > target value = SUBTRACT The ADD and SUBTRACT outputs 106 and 108 control the additions and subtractions of the master store loop and the slave store loop and are also combined by an OR gate 110 which feeds and AND gate 44. This gate is now enabled by D alone since N=1 and the elements 48,46 and 50 increment the P register 24 as in FIG. 1.

The slave store 12' and its adder 14', 16', 18' are as in FIG. 1 but the gates 22', 26' etc. are replaced by gates 112 which are connected to shift registers 114 forming an ROM 116. These registors store $\log_{10}$ 2, $\log_{10}$0.9, log $_{10}$1.01, etc. and are all connected in recirculating configuration so that read-out is nondestructive. Since N=M=1, all these shift registers, and the shift registers of both the master and slave stores 12 and 12' have the shift pulses C applied thereto.

The apparatus can also be arranged to implement the known Cordic algorithm efficiently. For a description of this algorithm see for example J.E. Volder, "The CORDIC Trignometric Computing Technique" in IRE Trans. on Electronic Computers, September 1959, pages 330 to 334.

Briefly if, referring to FIG. 8, sin $\theta$ and cos $\theta$ are present in registers 120 and 122 and $\theta$ is to be changed by 2 we have:

$$\sin(\theta+\alpha) = \sin\theta\cos\alpha + \cos\theta\sin\alpha \qquad (1)$$

$$\cos(\theta+\alpha) = \cos\theta\cos\alpha + \sin\theta\sin\alpha \qquad (2)$$

whence:

$$(1/\cos\alpha)\sin(\theta+\alpha) = \sin\theta + \cos\theta\tan\alpha \qquad (3)$$

$$(1/\cos\alpha)\cos(\theta+\alpha) = \cos\theta + \sin\theta\tan\alpha \qquad (4)$$

In decimal operation the CORDIC algorithm relies upon restricting $\alpha$ to increments whose tangents are 1.0, 0.1, 0.01, and so on, or more generally, in a number system having a radix R by restricting to increments whose targents are $R^0$, $R^{-1}$, $R^{-2}$, and so on; where 1.0 = $R^0$, 0.1 = $R^{-1}$, 0.01 = $R^{-2}$, and so on; R being the radix employed in the computation, and is typically but not necessarily 10. The $\alpha$ increments are added and subtracted as required to converge on the required value of $\theta$. This is illustrated schematically in FIG. 8 by adders 124 and 126 which perform equations (3) and (4) respectively.

The means for effecting the decimal shifts corresponding to multiplication by $\tan\alpha$ = 1, 0.1, 0.01, etc; are not illustrated but the shifts are performed in the manner of FIG. 1. The staging is controlled by block 127, which accumulates the $\alpha$ increments and determines whether to add or subtract, thereby causing $\alpha$ to converge on $\theta$ which is entered in a register 125. Details of the block 127 are not given, since it functions in the same manner as in known CORDIC computers and is analagous to items 102, 104 and 12 of FIG. 7, with register 12 accumulating the $\alpha$ increments from a ROM 129 shown in FIG. 8.

The basic disadvantage of the CORDIC algorithm is that the generated values are divided by the value cos $\alpha$(see equations (3) and (4)). This unwanted term has to be multiplied out. The conventional method of doing this is to force the algorithm invariably to use the whole sequence of $\alpha$ values $\alpha_1$ to $\alpha_n$ and then to multiply the answers by a constant $$K = \prod_{i=1}^{i=n} \cos\alpha_i.$$

This requires excess capacity in the registers to preserve the specified accuracy for sin $\theta$ and cos $\theta$.

This problem is avoided in a development of the present invention whereby the first $\alpha$ value is not arctan 1 but arctan 0.1, and whereby the algorithm is performed in double steps. From equations (3) and (4) the quantities generated are:

$$(1/\cos^2\alpha)\sin(\theta+2\alpha) = (1+\tan^2\alpha)\sin(\theta+2\alpha) \quad (5)$$

$$(1/\cos^2\alpha)\cos(\theta+2\alpha) = (1+\tan^2\alpha)\cos(\theta+2\alpha) \quad (6)$$

If each of the registers now has 0.01 times its contents subtracted, this is equivalent to multiplying by $(1-\tan^2\alpha)$ since $\tan\alpha = 0.1$ and therefore the contents of the register become:

$$(1-\tan^4\alpha)\sin(\theta+2\alpha) \quad (7)$$

and $$(1-\tan^4\alpha)\cos(\theta+2\alpha) \quad (8)$$

The error introduced by $\tan^4\alpha$ may well be negligible. If it is not, the contents of each register may be multiplied by 0.0001 and added to the contents, thereby to multiply by $(1+\tan^4\alpha)$. The contents of the registers are now $(1-\tan^8\alpha)$ times the required values and the eighth power ensures that the error is negligible. If an accuracy of 1 part in $10^6$ is required, the correction requirements are:

| | |
|---|---|
| $\tan\alpha = 0.1$ | Double correction required as above; |
| $\tan\alpha = 0.1$ | Single correction, using multiplying factor of 0.0001; |
| $\tan\alpha = 0.0001$, onwards | No correction required. |

To perform the correction, the apparatus alternates between the configurations of FIGS. 8 and 9. FIG. 8 performs the basic algorithm as explained above. FIG. 9 performs the correction.

The apparatus can, of course, also be employed to convert Cartesian coordinates $x, y$ to polar coordinates $r, \theta$ as explained in the paper by Volder. In this case the initial values entered in the registers 120 and 122 are $x$ and $y$.

What is claimed is:

1. Digital calculating apparatus comprising a first and a second shift register store;

means for entering a respective number having a respective predetermined initial value in each store;

a respective combining circuit associated with each store, each combining circuit being connected between opposite ends of its store to form a respective recirculation loop therewith, each combining circuit including means for carrying out a combining operation on the number in its store when the number is recirculated through the combining circuit, with successive combining operations serving to change the value of the number in the respective store in a predetermined progression as said number is successively recirculated through the respective combining circuit; and control means for successively recirculating the number in said first store through its respective combining circuit for a plurality of groups of N combining operations, where N is an integer greater than 0, to cause the number in said first source to converge to a predetermined final value, and for recirculating the number in said second store through its respective combining circuit for a group of M combining operations for each group of N combining operations of the combining circuit associated with the first store, where M is an integer not greater than N.

2. Digital calculating apparatus as in claim 1 wherein the combining means in at least one of said recirculating loops perform combining operations serving to change the value in the respective store in an exponential progression, the last recited combining operations being selectively additions to the store contents and subtractions from the store contents of the store contents divided by $R^P$, wherein R is the radix of the number system of the number in the store and P is initially zero and is incremented by one for each group of N combining operations.

3. Digital calculating apparatus as in claim 2 wherein both combining means perform the same type of combining operations serving to change the numbers in their respective stores in exponential progressions.

4. Digital calculating apparatus as in claim 3 where M=1 and N is greater than 1.

5. Digital calculating apparatus as in claim 3 wherein M=1 and N=2.

6. Digital calculating apparatus as in claim 3 where M=1 and N=3.

7. Digital calculating apparatus as in claim 2 wherein one of said combining means perform combining operations serving to change the number in the respective store in a linear progression, the last recited combining operations being selectively additions to and subtractions from the contents of its store of terms which are different for each group of N combining operations.

8. Digital calculating apparatus as in claim 7, wherein said terms are the terms of the series $$\log_{10} 2, \log_{10}(0.9), \log_{10}(1.01), \ldots,$$

with a successive term of said series being used as the term in each successive group of N combining operations.

9. Digital calculating apparatus as in claim 1 including register means for storing said final value, means for comparing the current contents of one of said stores with the contents of said register means, said control means controlling the combining operations in accordance with the results of the comparisons performed by said comparing means.

10. Digital calculating apparatus for performing the CORDIC algorithm comprising two registers, means for storing in said registers the values of two quantities, combining means connected to said two registers and operative in a succession of cycles for selectively adding to or subtracting from the contents of each register the contents of the other register multiplied, in successive pairs of cycles, by fractions $R^{-1}$, $R^{-2}$, $R^{-3}$, in a number system having a predetermined Radix R, and means connected to the registers and to the combining means and operative following at least the first pair of said cycles for correcting the contents of the registers by subtracting from the contents of each register its own contents multiplied by the square of the fraction used in the multiplying of the immediately preceding cycle.

11. Digital calculating apparatus as in claim 10 wherein the last recited means include means responsive to the completion of the correcting subtraction for carrying out a correcting addition in which the contents of each register are corrected by adding thereto the register contents multiplied by the fourth power of the fraction utilized in the immediately preceding cycle.

12. Digital calculating apparatus as in claim 11 wherein the Radix R is 10.

* * * * *